United States Patent [19]

Häuser et al.

[11] Patent Number: 4,851,084

[45] Date of Patent: Jul. 25, 1989

[54] PROCEDURE FOR OPERATING A PYROLYSIS PROCESS

[75] Inventors: Ulrich Häuser, Viernheim; Frank Steinstrasser, Herne, both of Fed. Rep. of Germany

[73] Assignee: BBC Brown Boveri Aktiengesellschaft, Mannheim, Fed. Rep. of Germany

[21] Appl. No.: 213,528

[22] Filed: Jun. 30, 1988

[30] Foreign Application Priority Data

Jun. 30, 1987 [DE] Fed. Rep. of Germany ....... 3721451

[51] Int. Cl.$^4$ ............................................. C10B 57/00
[52] U.S. Cl. ............................................. 201/1; 55/20; 201/30
[58] Field of Search ......................... 201/1, 2.5, 25, 30, 201/41; 48/209; 585/240, 241; 196/141; 55/20, 217

[56] References Cited

U.S. PATENT DOCUMENTS

| | | | |
|---|---|---|---|
| 2,911,061 | 11/1959 | Petersen | 55/217 |
| 4,187,085 | 2/1980 | Shibuya et al. | 55/217 |
| 4,591,366 | 5/1986 | Wohner et al. | 55/20 |
| 4,746,406 | 5/1988 | Timmann | 201/30 |

Primary Examiner—Joye Woodard
Attorney, Agent, or Firm—Herbert L. Lerner; Laurence A. Greenberg

[57] ABSTRACT

In a pyrolysis plant having a preliminary cooling stage and a final cooling stage, in the event of an operational malfunction of the preliminary cooling stage as indicated by temperature measurement of the pyrolysis gas cooled therein, the pyrolysis gas is withdrawn upstream of the final cooling stage and previously stored, cold pyrolysis gas is drawn from a gas reservoir and fed to the pyrolysis reactor and to the final cooling stage so that these parts of the plant can remain in unaltered operation. As a result of this procedure, a shutdown of the entire plant is avoided in the event of malfunctions of the preliminary cooling stage.

7 Claims, 1 Drawing Sheet

PROCEDURE FOR OPERATING A PYROLYSIS PROCESS

BACKGROUND OF THE INVENTION

1. Field of the Invention

The invention relates to a procedure for operating a pyrolysis plant in which waste material, especially waste material containing hydrocarbons such as rubber and/or plastic waste, is thermally decomposed and the hot pyrolysis gas produced is cooled in at least one preliminary cooling stage and at least one final cooling stage and at least a part of the cooled pyrolysis gas is stored in a gas reservoir.

2. Description of the Prior Art

In prior art pyrolysis plants of this type, the hot and combustible pyrolysis gas coming from the pyrolysis reactor with a temperature of approximately 400° to 1,000° C. and preferably 500° to 700° C., flows into the preliminary cooling stage in which it is cooled to a preliminary cooling temperature of approximately 120° to 300° C. and preferably 140° to 200° C. Subsequently, the pyrolysis gas is further cooled in at least one final cooling stage. This combustible, cooled pyrolysis gas is primarily used to meet an internal requirement, especially for heating the pyrolysis reactor and/or to provide fluidizing gas if the pyrolysis reactor is required to operate with a fluidized bed or a fluidized layer. The remaining pyrolysis gas is fed to a gas reservoir and is available for other applications, such as room heating.

For cost reasons, the final cooling stage and the other components connected downstream of the final cooling stage, such as, for example, a compressor and a gas reservoir, are only dimensioned and are only suitable for operating with a low temperature as compared with the operation of the preliminary cooling stage. It is therefore necessary to avoid penetration of hot pyrolysis gas into the final cooling stage and the components connected downstream in the event of an operational malfunction of the preliminary cooling stage, for example in the event of a failure of the coolant supply. This could be achieved by taking the plant out of operation in the event of an operational malfunction of the preliminary cooling stage. However, such a procedure would be very disadvantageous since the shut down and the start up of a pyrolysis plant require a certain time which is approximately two to five hours. Since the operational malfunctions of the preliminary cooling stage can in many cases be eliminated in a short time, the above-mentioned shut down of the pyrolysis plant is very uneconomical.

SUMMARY OF THE INVENTION

It is accordingly an object of the invention to provide a procedure for operating a pyrolysis plant, which overcomes the hereinafore-mentioned disadvantages of the heretofore-known methods of this general type and which permits the remaining parts of the plant to be able to continue to remain in operation with functions which are substantially as normal as possible, in the event of operational malfunctions of the preliminary cooling stage. In addition, it should be possible to carry out the procedure with little expenditure and therefore economically. Finally, the procedure should be suitable for plants with different pyrolysis reactors and should be capable of being carried out with great safety.

With the foregoing and other objects in view there is provided, in accordance with the invention, a procedure for operating a pyrolysis plant, which comprises thermally decomposing waste material producing pyrolysis gas, especially waste material containing hydrocarbons such as rubber and/or plastic wastes, cooling the pyrolysis gas in at least one preliminary cooling stage and at least one final cooling stage, storing at least part of the cooled pyrolysis gas in a gas reservoir, measuring a preliminary cooling temperature of the pyrolysis gas before entering the at least one final cooling stage, and removing the pyrolysis gas from the plant before reaching the at least one final cooling stage and feeding the stored pyrolysis gas drawn from the gas reservoir to the at least one final cooling stage, if the preliminary cooling temperature exceeds a given limiting value.

The temperature of the pyrolysis gas is therefore measured before it enters the final cooling stage. In the event of an operational malfunction of the preliminary cooling stage which may be initiated, for example, by the failure of the coolant supply, this temperature, which is referred to as the preliminary cooling temperature, increases. If the preliminary cooling temperature reaches a specified value, the pyrolysis gas flowing towards the final cooling stage is removed from the plant and at the same time cooled pyrolysis gas drawn from the gas reservoir is fed to the final cooling stage. The pyrolysis gas in the gas reservoir has approximately ambient temperature. The final cooling stage and those components which are connected downstream of the final cooling stage can therefore continue to be operated with a gas flow rate which is unaltered compared with normal operation. A time-consuming shutdown and restart-up of the plant is avoided as a result of this method. Since the pyrolysis gas produced in the pyrolysis reactor is removed from the plant, the pyrolysis reactor is also able to continue to operate without an interruption and without restriction. However, if it is seen that the malfunction of the preliminary cooling stage will last a relatively long time, in particular a half hour or more, then it is advantageous to shut down the pyrolysis reactor. This precludes having to burn unpurified gas for a relatively long time. The contamination of the environment with pollutants is thereby reduced. A further substantial advantage can be perceived in the fact that after the malfunction has been eliminated, the above-mentioned measures which have been introduced can be eliminated without loss of time and the pyrolysis plant can continue to operate immediately, or at least after a short time, with the normal operational sequence.

It should also be particularly emphasized that those parts of the plant which are supplied with cooled pyrolysis gas as an operating material by the final cooling stage, such as the gas burners heating the pyrolysis reactor or the fluidizing nozzles producing a fluidized bed in the pyrolysis reactor, for example, are supplied with pyrolysis gas which is drawn from the gas reservoir by the procedure according to the invention, even in the event of a malfunction, without taking particular steps.

In accordance with another mode of the invention, there is provided a procedure which comprises burning the pyrolysis gas removed from the plant in a gas burner, such as a surplus gas burner. This is advantageous since the pyrolysis gas removed from the plant cannot be used for another application as a consequence of its high temperature and/or due to impurities entrained therein.

In accordance with a further mode of the invention, there is provided a procedure which comprises carrying out the step of removing the pyrolysis gas from the plant upstream of the at least one preliminary cooling stage, and carrying out the step of feeding the stored pyrolysis gas to the at least one final cooling stage through the at least one preliminary cooling stage. This is done in order to ensure that the preliminary cooling stage is cooled down as rapidly as possible in the event of malfunction.

In accordance with an added mode of the invention, there is provided a procedure which comprises carrying out the step of removing the pyrolysis gas from the plant between the at least one preliminary cooling stage and the at least one final cooling stage, and carrying out the step of feeding the stored pyrolysis gas to the at least one final cooling stage directly. This is more beneficial in many cases and has the advantage that, in the normal operation of the pyrolysis plant, those parts of the plant which are provided for the removal of the hot pyrolysis gas come only into contact with pyrolysis gas already cooled in the preliminary cooling stage. It is therefore not necessary for these parts of the plant to have a long-term resistance to high temperatures.

In accordance with a concomitant mode of the invention, there is provided a procedure which comprises setting the given limiting value of the preliminary cooling temperature at which the above-mentioned measures are introduced, at the maximum permissible operating temperature of the final cooling stage.

Other features which are considered as characteristic for the invention are set forth in the appended claims.

Although the invention is illustrated and described herein as embodied in a procedure for operating a pyrolysis plant, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

DETAILED DESCRIPTION OF THE PREFERRED EMBODIMENTS

Figure 1:
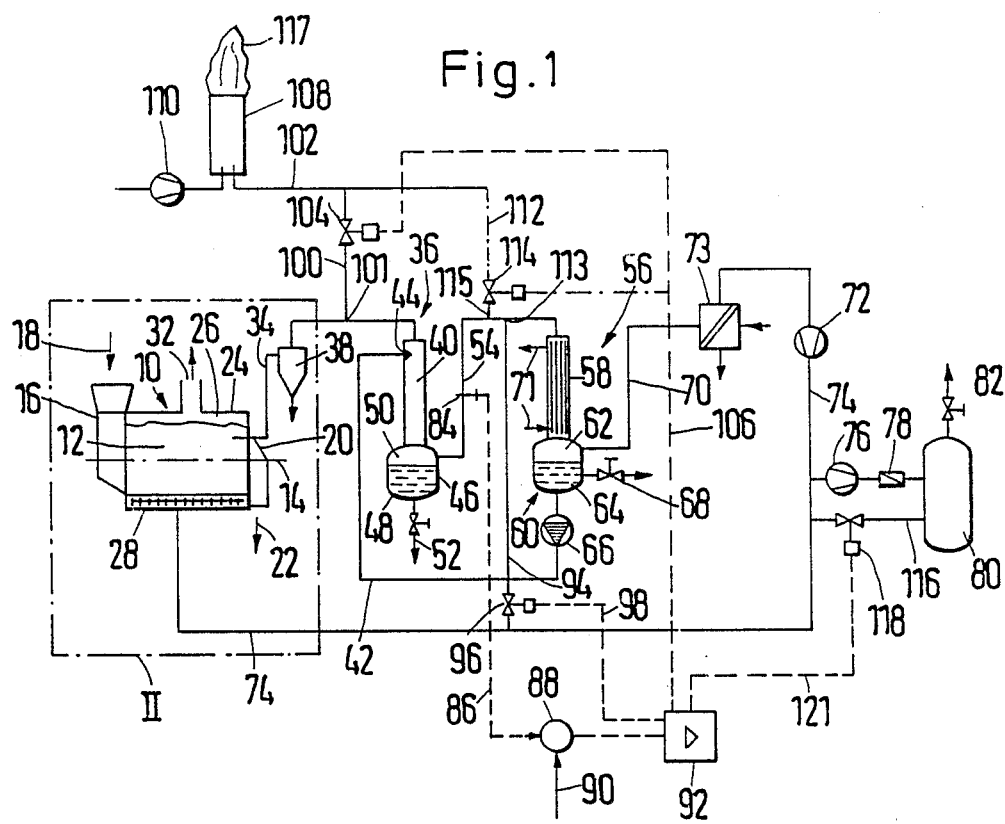
FIG. 1 is a diagrammatic and schematic circuit diagram of a pyrolysis plant with a pyrolysis reactor in the form of a horizontal drum which is suitable for carrying out the procedure according to the invention.

Referring now in detail to the figures of the drawings in which identical parts in the individual figures are provided with the same reference symbols and first, particularly, to FIG. 1 thereof, there is seen a pyrolysis plant having a pyrolysis reactor 10 which is provided with a horizontal drum 12. The drum 12 can be rotated about the approximately horizontally extending longitudinal axis 14 thereof by a non-illustrated drive. At one end of the pyrolysis reactor, which is the left-hand end in the drawing, a feed hopper 16 is provided which hermetically seals the internal space of the drum 12 with respect to the external space or surroundings and through which waste material fed in the direction of an arrow 18 can be introduced into the drum. The other end of the pyrolysis reactor, which is the right-hand end in the drawing, is provided with an outlet housing 20 which likewise hermetically seals the internal space of the drum 12 in a gas-tight manner with respect to the external space or surroundings. The pyrolysis residue is removed from the drum in the direction of an arrow 22 through the outlet housing 20.

The drum 12 is provided with a housing 24 which surrounds the drum at a distance so that a gap 26 is formed. A gas burner 28 which is supplied with fuel through a pyrolysis gas line 74 is provided underneath the drum 12 in the gap 26. An exhaust gas channel 32 which discharges into the external space or surroundings is connected to the upper region of the gap 26.

A hot gas line 34 leads to a preliminary cooling stage 36 from the internal space of the pyrolysis drum 12 and a cyclone separator 38 is inserted into the hot gas line.

The preliminary cooling stage 36 is provided for directly cooling the pyrolysis gas. Accordingly, the preliminary cooling stage 36 has a vertically extending heat exchange channel 40 with an upper end connected to the hot gas line 34. A coolant line 42 is likewise connected to the upper end of the heat exchange channel 40. The coolant line in this case is provided with a jet 44 which horizontally sprays the coolant into the heat exchange channel. The lower end of the heat exchange channel 40 discharges into a first separating vessel 46 having a lower region which serves as an oil space 48 and an upper region which serves as a gas space 50. The oil space 48 is furthermore provided with a line 52 which can be shut off.

A connecting line 54 leads from the gas space 50 of the first separating vessel to the final cooling stage 56. The final cooling stage 56 operates with indirect cooling and has a vertical tubular heat exchanger 58. The connecting line 54 is connected to the upper end of the vertical heat exchange tubes. The lower ends of the heat exchange tubes discharge into a gas space 62 which is formed in a second separating vessel 60 above a light-oil space 64. A line 68 provided with a shutoff valve and the coolant line 42 with an inserted pump 66, are connected to the light-oil space 64. The vertical tubular heat exchanger 58 is furthermore provided with lines 71 through which cooling water is fed and drained.

The gas space 62 of the second separating vessel 60 is connected through a line 70 to the suction side of a gas impeller 72 which is preferably constructed as a compressor. A further cooler 73 in which the pyrolysis gas is cooled further in indirect heat exchange, is preferably inserted in the line 70. Cooling water is preferably used as the coolant. The cooler 73 is only diagrammatically illustrated in the drawing. In practice, it is advantageous to construct the cooler 73 in exactly the same manner as the final cooling stage 56. In that case, the condensate which is produced during cooling and is formed of oil, is precipitated in a separating vessel.

The outlet of the gas impeller 72 is connected to the pyrolysis gas line 74. As mentioned above, the gas burner 28 of the pyrolysis reactor 10 is connected to the pyrolysis gas line 74 for supplying fuel gas. In addition, a compressor 76 connected to the pyrolysis gas line 74 has an outlet connected to a gas reservoir 80 through a return flow preventing device 78, which is preferably in the form of a non-return valve. The gas reservoir 80 is preferably in the form of a cylindrical vessel. In order to enable pyrolysis gas to be drawn from the gas reservoir 80, especially for room heating, a line 82 is provided with an inserted shutoff device.

A temperature sensor 84 which measures the temperature of the pyrolysis gas is advantageously provided in the form of a thermocouple in the connecting line 54 between the preliminary cooling stage 36 and the final cooling stage 56. A signal line 86 of the temperature sensor 84 leads to a temperature comparator 88 which is provided with a setting device 90 for a limiting value of the temperature. The output of the temperature comparator 88 leads to a regulating unit 92.

Connected to the pyrolysis gas line 74 is a feed line 94 which leads to the connection line 54 that connects the preliminary cooling stage 36 to the final cooling stage 56. Inserted in the feed line 94 is a remotely operated first shutoff device 96, advantageously in the form of a motor valve or a magnetic valve, which is connected to the regulating unit 92 for control purposes through an electrical line 98.

The hot gas line 34 is connected downstream of the cyclone separator 38 through a line 100 to a gas line 102. A second shutoff device 104 which is advantageously in the form of an electrical motor valve or a magnetic valve, is inserted in the line 100. In order to operate the second shutoff device 104, it is connected by an electrical line 106 to the regulating unit 92. The gas line 102 leads to a gas burner 108 which is disposed in the open air and which is advantageously constructed as a surplus gas burner. The combustion air required for the gas combustion in the gas burner 108 is fed by means of a blower 110 from the outside space or surroundings.

According to a variation of the structure, the line 100 may be omitted together with the second shutoff device 104, and instead the gas line 102 may be connected to the connecting line 54 by means of a line 112. In this case, a remotely operated third shutoff device 114, which is advantageously in the form of an electrical motor valve or a magnetic valve, is inserted in the line 112. The line 112 is connected to the regulating unit 92 by the electrical line 106, for the purpose of controlling the third shutoff device. As already explained, either the line 100 with inserted second shutoff device 104 or the pipeline 112 with the inserted third shutoff device 114 is provided and is connected to the gas line 102. In both cases the shutoff device 104 or 114 is connected by the electrical line 106 to the regulating unit 92. The structural variation is shown in phantom in FIG. 1.

The gas reservoir 80 is connected to the pyrolysis gas line 74 by a pipeline 116, with a fourth remotely operated shutoff device 118 that is advantageously in the form of an electrical motor valve or a magnetic valve, being inserted in the pipeline 116. An electrical line 121 which leads to the regulating unit 92 is provided for the purpose of controlling the fourth shutoff device 118.

Before the plant is operated, the maximum operating temperature of the final cooling stage is set on the limiting value setting device 90. The temperature at which the pyrolysis gas flows into the connecting line 54 is referred to as the preliminary cooling temperature. If the preliminary cooling temperature determined by the temperature sensor 84 is less than the limiting value which has been set, the regulating unit closes the respective shutoff devices 96, 104 or 114, and 118. This condition exists in the normal operation of the plant. The limiting value of the preliminary cooling temperature is preferably between 150° and 300° C. and preferably between 140° and 200° C.

If the temperature of the pyrolysis gas in the connecting line 54 rises above the limiting value of the preliminary cooling temperature which is envisaged and set at the setting device 90 and in the present case is 150° C. for example, the first shutoff device 96, the second shutoff device 104 or the third shutoff device 114 respectively, as well as the fourth shutoff device 118, are opened by the regulating unit 92. This operating condition is not automatically rescinded by the regulating unit 92 if the temperature of the pyrolysis gas in the connecting line 94 should drop below the set limiting value. In order to reach the normal operation of the plant again, the regulating unit 92 has to be switched again to normal operation by additional measures, in particular by manual operation.

The overall operation of the plant therefore proceeds as follows. Comminuted waste material, preferably rubber or plastic waste, is fed in the direction of the arrow 18 into the feed hopper 16 of the pyrolysis reactor 10, from which point it passes into the pyrolysis drum 12. The pyrolysis drum rotates about its longitudinal axis 14 at approximately 3 to 7 rpm. At the same time, the pyrolysis drum is heated by the gas burner 28 which is supplied with pyrolysis gas as fuel from the pyrolysis gas line 74. While the drum 12 is being heated, the hot flue gases flow upwards in the gap 26 and are fed to the outside through the waste gas channel 32. Since the longitudinal axis 14 of the drum 12 has a slope of approximately 5° to 10° in the direction of the outlet housing 20, the waste material migrates in the drum towards the outlet housing 20 so that the pyrolysis residues emerge at that point and are discharged in the direction of the arrow 22.

The hot pyrolysis gas, which has a temperature of 400° to 1,000° C., is drawn from the internal space of the drum 12 through the hot gas line 34 and fed through the cyclone separator 38, which removes dust particles, to the preliminary cooling stage 36. The hot pyrolysis gas enters the heat exchange channel 40 and flows downwards towards the first separating vessel 46. In order to cool the hot pyrolysis gas, low-boiling pyrolysis oil is drawn from the second separating vessel 60 and fed to the heat exchange channel 40 through the pump 66. The cooling is brought about by the low-boiling pyrolysis oil being sprayed into the heat exchange channel 40 through the jet 44. In the heat exchange channel 40, the mixture composed of finely atomized pyrolysis oil and hot pyrolysis gas flows downwards to the first separating vessel 46, during which process the hot pyrolysis gas cools down. At the same time, a high-boiling pyrolysis oil condenses and collects in the oil space 48 of the first separating vessel, from where it can be removed through the line 52. The pre-cooled pyrolysis gas collects in the gas space 50 above the oil space 48. The temperature of the pre-cooled pyrolysis gas is referred to as the preliminary cooling temperature. In the present exemplary embodiment it should be 150° C. Normally it lies in a range between 130° and 230° C.

The pyrolysis gas flows at the preliminary cooling temperature through the connecting line 54 to the final cooling stage 56. At the same time, the temperature of the pyrolysis gas is measured by the temperature sensor 84. The pyrolysis gas entering the final cooling stage at the preliminary cooling temperature flows downward to the second separating vessel 60, while being cooled in the vertical heat exchange tubes of the vertical tubular heat exchanger 58. In this case the cooling is brought about by cooling water which is supplied or removed through the lines 71.

While the pyrolysis gas is being cooled, low-boiling pyrolysis oil which collects in the light-oil space 64 of the second separating vessel 60 is produced in the final cooling stage. In addition to the coolant line 42, the line 68 with a shutoff valve inserted for removing the low-boiling pyrolysis oil, is furthermore connected to the light-oil space 64.

The pyrolysis gas is removed from the gas space 62 of the second separating vessel through the line 70 and is fed through the cooler 73 to the gas impeller 72 which is constructed as compressor or blower. The gas impeller 72 forces the pyrolysis gas into the pyrolysis gas line 74. The gas burner 28 of the pyrolysis reactor 12 is supplied with fuel gas from the pyrolysis gas line 74. The pyrolysis gas in the gas space 62 has a temperature of 30° to 60° C. Downstream of the cooler 73, the temperature of the pyrolysis gas is approximately 10° to 20° C. and it is free of condensable constituents.

That pyrolysis gas which is not necessary for supplying the gas burner 28 is conveyed through the compressor 76 and the return-preventing or one-way device 78 into the gas reservoir 80.

The pressure in the gas reservoir 80 is approximately 4 to 10 bar. The line 82 which is provided with a shutoff device is connected to the gas reservoir 80 for removing pyrolysis gas to be used further, such as for operating heating plants or motors.

It should further be noted that the cooled pyrolysis gas is advantageously also passed through non-illustrated gas washing equipment and/or gas filtering equipment before it enters the gas impeller 72.

The final cooling stage and the further equipment connected downstream of the final cooling stage such as, for example, the cooler 73, the gas impeller 72 and the gas compressor 76 are not suitable for exposure to hot pyrolysis gas as it flows into the preliminary cooling stage 36, because of the construction thereof.

Upon the occurrence of a malfunction of the preliminary cooling stage 36, such as may be initiated by the failure of the coolant supply, the preliminary cooling stage becomes ineffective and the hot pyrolysis gas flows uncooled into the connecting line 54. The limiting value of the preliminary cooling temperature, in the present case 150° C., which is set at the setting device 90, is therefore exceeded and is measured by the temperature sensor 84. In this case, the fact that the preliminary cooling temperature has been exceeded is conveyed by the comparator 88 to the regulating unit 92. The regulating unit 92 therefore initiates the opening of the first shutoff device 96, the second shutoff device 104 as well as the fourth shutoff device 118.

After flowing through the cyclone separator 38, the hot pyrolysis gas is drawn off from the hot gas line 34 at a point 101 and fed through the line 100, the opened second shutoff device 104 and the gas line 102 to the gas burner 108. In the gas burner 108, the hot pyrolysis gas is burnt with the aid of air which is supplied by the blower 110. Since the gas burner 108 is advantageously in the form of a surplus gas burner which is situated in the open air, no further measures are necessary for the removal of the combustion products formed by a flame 117. The flame is ignited by suitable means, for example by an electrical ignition spark.

Stored cooled pyrolysis gas is at the same time drawn from the gas reservoir 80 through the opened fourth shutoff device 118 and passed into the pyrolysis gas line 74. This stored pyrolysis gas is then used to operate the gas burner 28. At the same time, stored pyrolysis gas is drawn from the pyrolysis gas line 74 through the opened shutoff device 96 and fed through the feed line 94 to the final cooling stage 56. The stored pyrolysis gas in this case is fed into the connecting line 54.

The pyrolysis reactor remains in unaltered operation in the above-described operating mode, and the hot pyrolysis gas which is produced flows to the gas burner 108 without contacting the cooling stages and is burnt at that point. At the same time, the final cooling stage 56, the cooler 73 and the gas impeller 72 and optionally other equipment, also remain in unaltered operation. The gas flow necessary for this operation is produced by means of the stored pyrolysis gas which is fed through the pyrolysis gas line 74 to the final cooling stage 56. The entire plant is divided into two parts of the plant which operate separately. The first part of the plant is exposed to the hot pyrolysis gas, while only stored pyrolysis gas which has already been cooled flows through the second part of the plant. This part of the plant is therefore protected against overheating.

If coolant is again available for the preliminary cooling stage so that the plant can be operated normally, the regulating unit 92 is preferably manually operated in such a manner that the shutoff devices 96, 104 and 118 close and the pyrolysis gas again takes the normal route described above. The manual operation avoids the possibility of the preliminary cooling stage 36 starting to operate spontaneously if the preliminary cooling temperature should drop below the limiting value, in the event of a malfunction.

Removal of the hot pyrolysis gas from the hot gas line 34 by means of the line 100 will be carried out if the second shutoff device 104 can be placed so far away from the hot gas line 34 that it is not heated during normal operation by the hot pyrolysis gases flowing at that point. It would then only be exposed to hot pyrolysis gas and heated in the case of a malfunction described above. At any rate, since such a malfunction is generally only short-term in proportion to the overall operating period of the pyrolysis plant, the second shutoff device 104 is only exposed to high temperatures for a short time, as a result of which its service life is considerably increased.

The line 100 is connected to a point 101 along the hot gas line 34. The distance between the point 101 and the second shutoff device 104 is at least 5 times the outside diameter of the line 100. A distance which is at least 15 times the outside diameter of the line 100 is preferred.

For structural reasons, the shutoff device provided for the removal of the pyrolysis gas may have to be provided in the vicinity of the line which carries the pyrolysis gas. In such a case it is advantageous to select the configuration shown in phantom in FIG. 1. According to that configuration, the line 100 as well as the second shutoff device 104 and the part of the electrical line 106 leading to the second shutoff device 104 are omitted, and in place thereof the gas line 102 is connected by the line 112 with inserted third shutoff device 114 to the connecting line 54, the third shutoff device 114 being connected to the electrical line 106. The distance between a connecting point 115 and the third shutoff device 114 in this case is less than 15 times the outside diameter of the line 112. Preferably, the distance is less than 5 times the outside diameter of the line 112. In the normal operation of the plant, a pyrolysis gas which is at the preliminary cooling temperature, in this case 150° C., flows in the connecting line 54. The precooled pyrolysis gas is consequently substantially colder than the hot pyrolysis gas which leaves the pyrolysis reactor and which has a temperature of between 400° and 1,000° C. The third shutoff device 114 may therefore be in the immediate vicinity of the connecting line 54 and may even be directly connected to the connecting line. During the normal operation of the plant, the temperature of the third shutoff device 114 can only reach a temperature which is equal to the preliminary cooling temperature of the pyrolysis gas. Exposure to higher temperatures only takes place during a case of malfunction which is comparatively short in proportion to the normal duration of operation.

The normal operation proceeds in exactly the same way as described above and, in the case of a malfunction of the preliminary cooling stage 36, the preliminary cooling temperature in the connecting line 54 rises so that the regulating unit 92, which is triggered by the temperature sensor 84, opens the first shutoff device 96, the third shutoff device 114 and the fourth shutoff device 118. The plant then continues to operate, as described above, without the final cooling stage and equipment connected downstream thereof being exposed to impermissibly high temperatures. It should further be noted here that, in the event of a malfunction, the hot pyrolysis gas still flows through the preliminary cooling stage 36 before it is removed from the plant.

It is of importance in this connection that the feed line 94 is connected downstream of the connecting point 115 of the line 112 to the connecting line 54. The distance is approximately 5 to 15 times and preferably 7 to 12 times the outside diameter of the connecting line 54. As a result of this construction, any flow of hot pyrolysis gas into the final cooling stage 56 is avoided. Since the stored pyrolysis gas has a substantially higher pressure than the hot pyrolysis gas in the connecting line 54, the blocking action is increased even further. Advantageously, a remotely operated shutoff device, for example a motor or magnetic valve, is disposed in the connecting line 54 between the connecting point 115 of the line 112 and the connecting point 113 of the feed line 94. The shutoff device is likewise connected to the regulating unit 92 and is kept open by the regulating unit during normal operation, but is closed in the event of a malfunction. This embodiment is not shown in the drawings.

In other respects, the operation of the plant proceeds as described previously, so that further explanations are superfluous.

Figure 2:
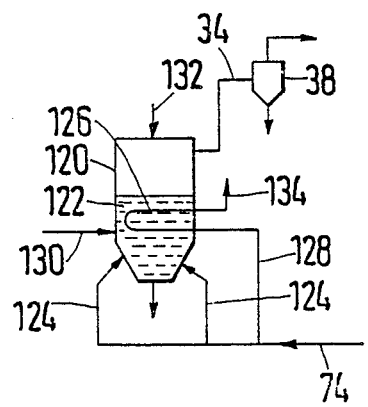
FIG. 2 is a diagrammatic and schematic circuit diagram of the portion II of FIG. 1, showing a vertical pyrolysis reactor which operates with a fluidized layer.

FIG. 2 shows a structural variation which may form the portion II of FIG. 1. The pyrolysis reactor 120 has a vertical construction and employs a fluidized bed 122, with sand preferably being used as fine-grained fluidizing material. In order to fluidize the fluidizing material and produce the fluidized bed, a fluidizing gas is fed through fluidizing gas lines 124 into the lower region of the pyrolysis reactor, which narrows conically downwards. The cold pyrolysis gas which is drawn from the pyrolysis gas line 74 serves as fluidizing gas. For this purpose, the fluidizing gas lines 124 are connected to the pyrolysis gas line 74.

In order to heat the fluidized bed 122, at least one hairpin-shaped heating tube 126, which is fired with pyrolysis gas, is horizontally disposed in the fluidized bed. For this purpose, the heating tube 126 is connected to the pyrolysis gas line 74 by a pipeline 128.

During operation, the pyrolysis reactor is fed with comminuted or small-size waste material, preferably rubber or plastic wastes, in the direction of an arrow 130 at the top. At the same time, fluidizing sand and powdered aggregate material for binding pollutants are fed into the pyrolysis reactor, as is indicated by an arrow 132. In addition, pyrolysis gas is fed into the pyrolysis reactor thorugh the fluidizing gas line 124 so that the fluidized bed 122 is produced. The fluidized bed is heated to a temperature of 400° to 1,000° C. by the fired heating tube 126 and waste gas of the heating tube is discharged through the line 134. The waste material fed into the fluidized bed 122 is heated up by the fluidized bed and degasified. The hot pyrolysis gas which is produced is drawn off from the pyrolysis reactor through the hot gas line 34 and fed to the preliminary cooling stage 36 through the cyclone separator 38. The mode of operation of the parts of the plant connected downstream of the pyrolysis reactor 120 proceeds as described in conjunction with FIG. 1, so that further explanations at this point would be superfluous.

In the structural variation according to FIG. 2, in the event of a malfunction, the fluidized bed 122 and the heating thereof are maintained by the stored pyrolysis gas drawn from the gas reservoir 80. The operation of the remaining parts of the plant is continued as described above using the stored pyrolysis gas.

We claim:

1. A pyrolysis process, which comprises thermally decomposing waste materials to produce a pyrolysis gas, cooling the pyrolysis gas in at least one preliminary cooling stage and at least one final cooling stage, storing at least part of the cooled pyrolysis discharged from the at least one final cooling stage in a gas storage means, measuring the temperature of the pyrolysis gas discharged from the at least one preliminary cooling stage and comparing the measured temperature with a a predetermined temperature value, and withdrawing the pyrolysis gas upstream of the at least one final cooling stage and feeding the cooled pyrolysis gas from the gas storage means to the at least one final cooling stage if the measured temperature exceeds the predetermined temperature value.

2. Process according to claim 1, wherein the waste materials contain hydrocarbons.

3. Process according to claim 1, wherein the waste materials contain at least one of rubber and plastic wastes.

4. Process according to claim 1, which comprises burning the withdrawn pyrolysis gas in a gas burner.

5. Process according to claim 1, which comprises withdrawing the pyrolysis gas upstream of the at least one preliminary cooling stage.

6. Process according to claim 1, which comprises withdrawing the pyrolysis gas from between the at least one preliminary cooling stage and the at least one final cooling stage, and feeding the stored pyrolysis gas to the at least one final cooling stage by introducing the stored pyrolysis gas directly into the at least one final cooling stage.

7. Process according to claim 1, which comprises setting the predetermined temperature value at the maximum permissible operating temperature of the at least one final cooling stage.

* * * * *